(No Model.) 3 Sheets—Sheet 1.

D. LUBIN.
CLOD CRUSHER.

No. 357,842. Patented Feb. 15, 1887.

Witnesses,
D. S. Clark
T. Walter Fowler

Inventor,
David Lubin
per atty.
A. H. Evans & Co.

N. PETERS, Photo-Lithographer, Washington, D. C.

(No Model.) 3 Sheets—Sheet 2.

D. LUBIN.
CLOD CRUSHER.

No. 357,842. Patented Feb. 15, 1887.

Witnesses:
D. S. Clark.
T. Walter Fowler

Inventor
David Lubin
Per attys.
A. H. Evans & Co.

(No Model.)

D. LUBIN.

CLOD CRUSHER.

No. 357,842.

3 Sheets—Sheet 3.

Patented Feb. 15, 1887.

Witnesses,
Geo. H. Strong.
J. B. Rounse.

Inventor,
David Lubin
By Dewey & Co.
Atty.

UNITED STATES PATENT OFFICE.

DAVID LUBIN, OF SACRAMENTO, CALIFORNIA.

CLOD-CRUSHER.

SPECIFICATION forming part of Letters Patent No. 357,842, dated February 15, 1887.

Application filed September 30, 1886. Serial No. 214,968. (No model.)

*To all whom it may concern:*

Be it known that I, DAVID LUBIN, of Sacramento, Sacramento county, State of California, have invented an Improvement in Clod-Crushers; and I hereby declare the following to be a full, clear, and exact description of the same.

My invention relates to a device for breaking or disintegrating clods or masses of earth; and it consists of a series of adjustable arms or lifters supported from a suitable fulcrum or an axle which is journaled in a suitable frame-work, and, in combination with these arms or lifters, of a series of independent disks or wheels having arms or teeth projecting from their peripheries, these disks turning about a shaft or axis extending across the frame and moving between the arms, so that any lumps or clods which are brought up by the arms will be broken by the action of the teeth striking against the clods, which are supported temporarily by the bars upon each side while the teeth pass between them. In connection with this I have shown the preliminary cultivator and levers by which the cultivator may be raised or depressed, and also by which the lifting-arms may be raised or depressed.

Figure 1:
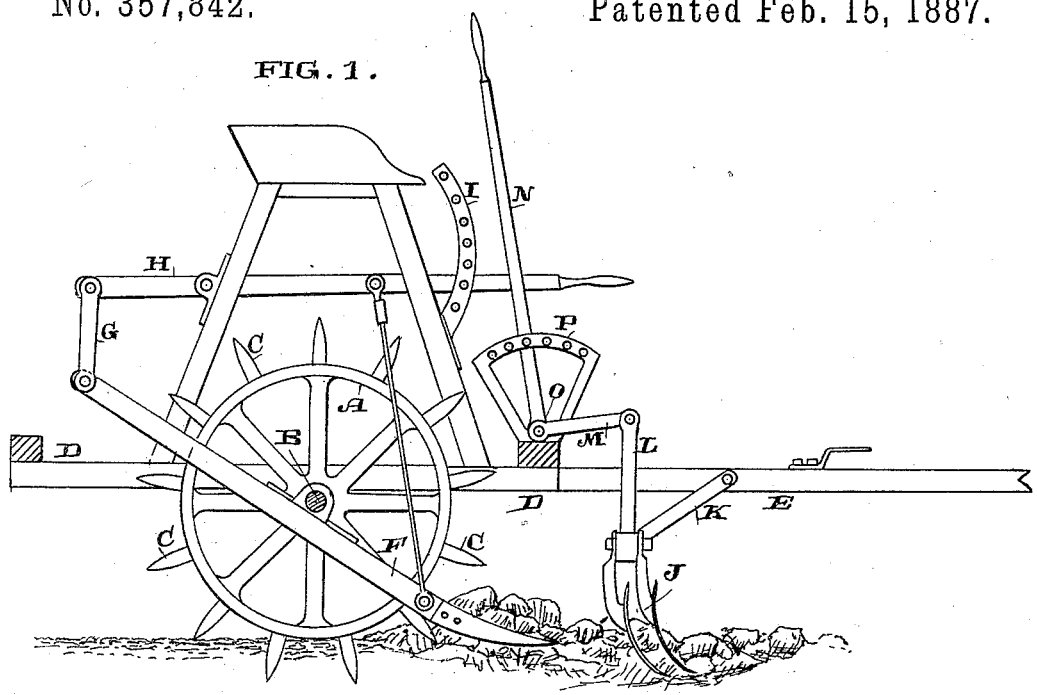
Figure 2:
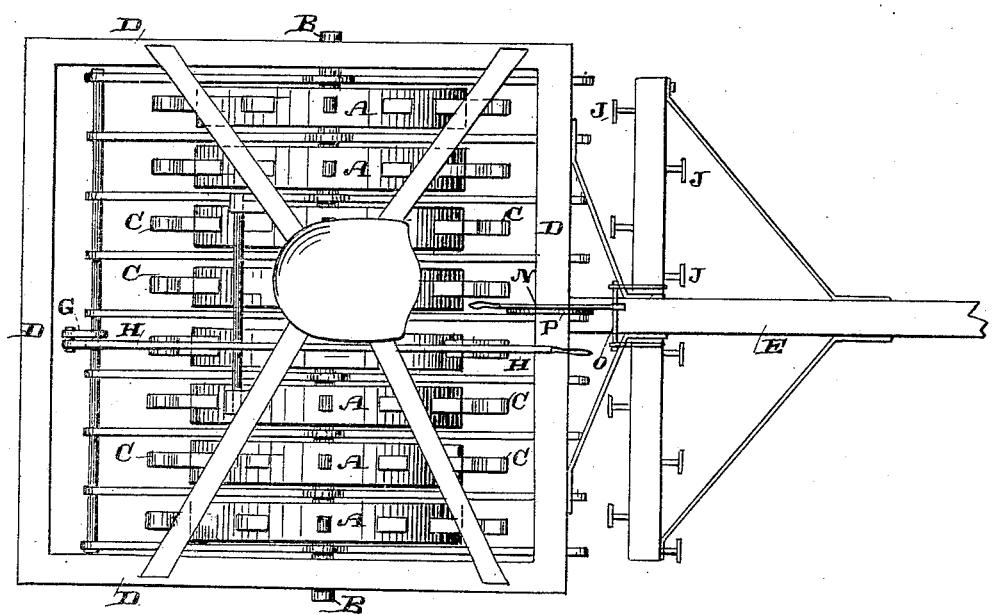
Figure 3:
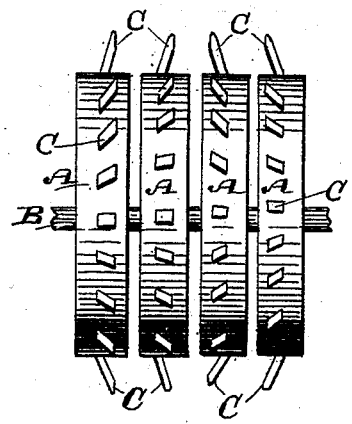
Figure 4:
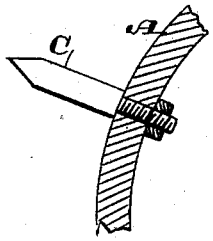
Figure 5:
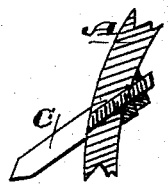
Figure 6:
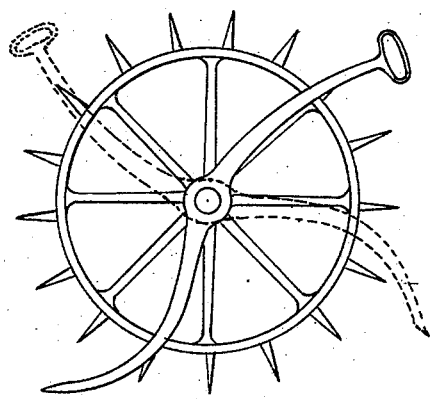
Figure 8:
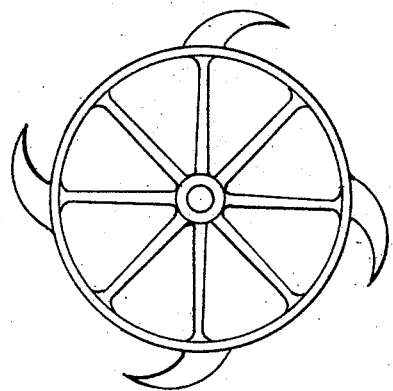
Figure 7:
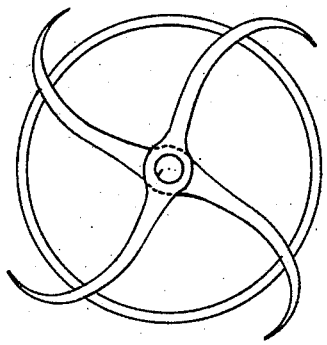

Referring to the accompanying drawings for a more complete explanation of my invention, Figure 1 is a view of my apparatus, showing a vertical section. Fig. 2 is a plan. Fig. 3 shows the teeth set angularly in the disks. Figs. 4 and 5 are details of teeth. Figs. 6, 7, and 8 illustrate modifications, to be hereinafter referred to.

In a former application for a patent, filed by me August 11, 1886, No. 210,639, I have shown an arrangement of lifting-fingers and toothed disks arranged and rotated so as to pass between these fingers. In that invention the disks were shown as all being secured to the single cylinder.

I have found that when stones or other hard substances are brought up by the fingers, which cannot be broken by the teeth of the disks, it is preferable to have only the one disk temporarily stopped, instead of having the whole stopped, as would be the case if they were all rigidly secured together, in which case the strain would be apt to break some portion of the apparatus.

In my present invention the disks are mounted so as to rotate separately and independently. In the present case, A are disks, mounted upon a shaft or axis, B, so as to turn upon it loosely and independently. These disks have projecting arms, spikes, or teeth C, of any suitable pattern, which are intended to travel upon and penetrate the ground as the apparatus is drawn along over it. These teeth may project radially, or they may be set alternately to opposite sides, as shown in Fig. 3.

D is the frame, upon which the axis or shaft B is fixed or journaled, and E is the pole by which draft is applied to move the machine over the ground.

Between the disks A are arms or fingers F, which are suitably fulcrumed, but preferably as shown upon the shaft or axis B, so as to stand at an angle, with their points projecting forward and downward and somewhat in advance of the spiked disks A. The rear ends of these fingers extend backwardly to a point behind the disks, and are united together by a bar or frame which rigidly connects their rear ends, holding them together as one to prevent their oscillating upon the axis in case the journals become worn or loose. This bar or frame-work is connected by a link, G, with a lever, H, suitably fulcrumed upon the seat of the frame or other portion of the apparatus, and extending forward to within easy reach of the driver. A segment-rack, I, serves to hold this lever at any desired point, and by its operation the teeth or fingers F may be raised entirely out of the ground, or depressed so as to enter it to any required degree. In order to make these teeth economically, I prefer to make the upper portion of cast or malleable metal, which shall remain permanently attached to the machine; but the points or teeth may be made of steel and bolted to or otherwise attached to this portion, so that they may be easily replaced from time to time in case of wear or breakage.

The operation of the device will be as follows: The points of the teeth or lifters F being depressed so as to enter the ground slightly, they will lift up any clods or earth which may be packed together so as to be of sufficient size, and as these clods move backward they will be struck by the tooth-points C of the disks A. The clod being supported by the fingers F upon each of its outer edges, the teeth C, coming down upon its central portion, will act upon it with a leverage which will tend to break or crush it, when the same amount of power applied to the clod resting upon the surface of the ground would be unable to break it at all. By making these disks independent of each other it will be seen that if a stone or other large substance which is too hard to be broken should be brought up by the fingers only the disk whose teeth are engaged with this stone will be stopped, while the others will continue their rotation and work. This particular one being stopped will thus act simply as a harrow, being dragged through the ground temporarily until it can be relieved of the stoppage, and the strain will thus be so reduced that it will not tend to break any portion of the apparatus. These disks and fingers serve also as gages to determine the size to which the material is to be pulverized.

It will readily be seen that the disks may be brought very near together upon the shaft, or they may be separated by the introduction of washers between them, or by other suitable means, so that the space may be graduated to any size that may be desired. This construction thus gives me absolute control over the size of the clods, and it enables me to apply my power in the form of a leverage to the central portion of the clod, while the sides are supported as upon fulcrums. In many places it is found that deep channels or depressions are formed by rolling ground or by deep dead furrows, and these channels are such that when this apparatus passes over them it is not possible for it to lift up the ground or clods. In order, therefore, to loosen the ground when packed by rain or otherwise, I employ a cultivator, J, which extends along in front of the fingers F, and is supported from the pole or frame-work of the machine by arms K, which extend at an angle, as shown, so that the cultivator may be raised or depressed about these arms.

L are links connecting the cultivator-beam with the lever-arms M, and these are actuated by the hand-lever N, which projects upward from the fulcrum O, so as to be within easy reach of the driver.

P is a rack with which the lever N may be engaged, so as to hold the cultivator at any desired point, either in or out of the ground.

This cultivator serves to loosen up the soil in front of the fingers F, and especially in the depressions in the ground, such as previously described, and raises the clods so that they may be easily taken up by the fingers F and be pulverized, as before described.

If the ground is more or less obstructed by weeds or for other reasons, the fingers or arms of the disk become clogged by too much material being brought to them, I have devised a method for clearing the fingers, allowing them to turn backward about their journals or points of support. Figs. 6, 7, and 8 show three different ways of producing this result.

In Fig. 6 I have shown the arms or fingers having extensions behind their fulcrums, which may be provided with stops or holding-clamps, so that when the fingers are in the proper position to be operated they will be held in that position; but if one or more become clogged or overloaded the upper and rear ends or extensions may be released, and the fingers then turn about the fulcrums to the rear, as shown in dotted lines, thus clearing themselves.

In Fig. 7 I have shown another form, in which four arms are fulcrumed upon a common center, which in the present case would be the same center or shaft that the disks are mounted upon. Either one of the curved arms will be presented to the front to act as the finger, and, as there is one of these devices between each pair of disks, it will be seen that the series of fingers will be complete. In this case a device is employed to hold one of the rearwardly-projecting arms stationary, so that the finger which is in the ground will act. In case it becomes clogged, it is only necessary to allow the device to rotate a part of a turn, when this finger will pass to the rear and another finger will arrive in its place, ready to go on with the work, while the first one is relieved from the material which has clogged it.

In Fig. 8 I have shown these arms or fingers as projecting from a disk which is journaled upon the same shaft with the disks A, and operates in the same manner as the one described.

Having thus described my invention, what I claim as new, and desire to secure by Letters Patent, is—

1. The series of disks having projecting arms or points which enter the ground, and by which the disks are caused to rotate as the machine travels over its surface, in combination with inclined arms or fingers the points of which project beyond the arms or points on the disks, whereby said arms or fingers enter the ground in advance of the disks, so as to raise lumps or clods to be acted upon by the spikes or teeth of the disks, substantially as herein described.

2. The independent rotating disks journaled upon a shaft or axis by which the frame is supported, and having radially-projecting teeth or spikes, in combination with the inclined arms having points which enter the ground in advance of the disks, so as to raise lumps or clods to be crushed, and a rigid bar or frame uniting the rear ends of said inclined arms, and a lever for raising and depressing the same, substantially as herein described.

3. The independently-rotating disks having teeth or arms projecting radially therefrom, the inclined adjustable lifting arms or fingers fulcrumed upon the shaft between the disks, having their rear ends united, and an operating-lever, in combination with a supplemental cultivator extending across the machine in front of the lifting-fingers, the suspending-link, and the lever by which the cultivator is raised or depressed, substantially as herein described.

4. In a clod crusher or pulverizer, the means for gaging the size of the pulverized material, consisting of the lifting arms or fingers upon which the clods are supported, in combination with the rotating arms which pass between the fulcrums and act as levers to break the clods, said fingers and rotating arms being made adjustable to or from each other, as herein described.

5. A series of rotary disks, in combination with arms or fingers projecting toward the front and beyond the line of the disks, so that their points enter the ground and raise the lumps or clods to be acted on, said arms being adapted to be rotated or turned backward to release an obstruction, substantially as herein described.

In witness whereof I have hereunto set my hand.

DAVID LUBIN.

Witnesses:
EDWARD BONNHEIM,
WM. S. KEELS.